(12) United States Patent
Vock et al.

(10) Patent No.: US 11,509,151 B2
(45) Date of Patent: Nov. 22, 2022

(54) CHARGING STAND WITH SWIVEL JACK

(71) Applicant: WAHL CLIPPER CORPORATION, Sterling, IL (US)

(72) Inventors: Tracy Vock, Morrison, IL (US); Jon Freas, Sterling, IL (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 503 days.

(21) Appl. No.: 16/201,820

(22) Filed: Nov. 27, 2018

(65) Prior Publication Data

US 2020/0169100 A1 May 28, 2020

(51) Int. Cl.
*H01M 10/46* (2006.01)
*H02J 7/00* (2006.01)

(52) U.S. Cl.
CPC .................. *H02J 7/0044* (2013.01)

(58) Field of Classification Search
CPC ...... H02J 7/0044; H02J 7/0045; H02J 7/0027; H02J 7/025; H02J 7/0042; H01R 13/514; H01R 13/502; H01R 13/629; H01R 13/73; A45D 27/29
USPC ......................................... 320/107, 114, 115
See application file for complete search history.

(56) References Cited

U.S. PATENT DOCUMENTS

| | | |
|---|---|---|
| 2,292,449 A | 8/1942 | Kobler et al. |
| 4,719,314 A | 1/1988 | Nothnagel et al. |
| 4,958,432 A | 9/1990 | Marshall |
| 6,152,639 A | 11/2000 | Hsu |
| 6,230,860 B1 | 5/2001 | Wu |
| 6,417,645 B1 | 7/2002 | Yamaguchi et al. |
| D465,304 S | 11/2002 | Bushman |
| D469,221 S | 1/2003 | Cozzolino et al. |
| 6,683,396 B2 | 1/2004 | Ishida et al. |
| D513,346 S | 12/2005 | Buck, Jr. |
| 7,102,328 B2 | 9/2006 | Long et al. |
| D621,347 S | 8/2010 | Aulwes et al. |
| 7,771,216 B2 | 8/2010 | Grems et al. |
| 7,887,332 B2 | 2/2011 | Bauer et al. |
| 8,579,641 B1 * | 11/2013 | Queru ................ H01R 33/7671 439/224 |
| 8,651,874 B2 | 2/2014 | Ku et al. |
| 8,979,549 B2 * | 3/2015 | Lin ........................ H01R 13/46 439/31 |
| 9,438,017 B2 | 9/2016 | Irons et al. |

(Continued)

FOREIGN PATENT DOCUMENTS

| | | |
|---|---|---|
| GB | 2479186 | 10/2011 |
| JP | 2003100354 A | 4/2003 |
| WO | 2015165497 | 11/2015 |

OTHER PUBLICATIONS

European Search Report from the corresponding European Patent Application No. 19205654.7, dated Mar. 24, 2020.

(Continued)

*Primary Examiner* — Edward Tso
(74) *Attorney, Agent, or Firm* — Greer, Burns & Crain, Ltd

(57) ABSTRACT

An appliance charging stand is provided, including a housing with an upper portion defining a receptacle for an appliance, a base connected to the upper portion and having a peripheral edge. A swiveling jack defines a power cord connection socket and is rotatably secured between the upper portion and the base to swivel about a vertical axis between a first position and a second position.

20 Claims, 4 Drawing Sheets

(56) References Cited

U.S. PATENT DOCUMENTS

| | | |
|---|---|---|
| 9,800,031 B2 | 10/2017 | Irons et al. |
| 9,941,650 B2 | 4/2018 | Tien et al. |
| 2005/0007066 A1 | 1/2005 | Long et al. |
| 2009/0029577 A1 | 1/2009 | Grems et al. |
| 2012/0028498 A1 | 2/2012 | Na et al. |
| 2014/0235079 A1* | 8/2014 | Wallace ................ H01R 35/04 439/131 |
| 2016/0134071 A1* | 5/2016 | Toh ..................... H01R 35/04 439/13 |
| 2016/0204636 A1* | 7/2016 | Allen .................. H02J 7/00038 320/115 |
| 2016/0374395 A1* | 12/2016 | Jordan ................. A24F 47/008 131/329 |
| 2017/0346249 A1* | 11/2017 | Tien ..................... H01R 31/00 |

OTHER PUBLICATIONS

Examination Report No. 1. from Australian Patent Application No. 2019257359, dated Nov. 9, 2020.

\* cited by examiner

CHARGING STAND WITH SWIVEL JACK

BACKGROUND

The present invention relates generally to charging stands for hand-held appliances, and more particularly to a charging stand for a rechargeable hair clipper or trimmer.

Professional hair stylists and barbers (hereinafter collectively referred to as "stylists") are increasing their use of rechargeable hand-held hair clippers and trimmers. The reasons for the shift away from corded appliances include the inconvenience of dealing with the cord as the stylist moves about the customer, an interest in reducing clutter at the stylist's work area, and also the reduced weight of modern rechargeable hair clippers and trimmers due to improved electric motor and battery technology, along with other technical enhancements.

One disadvantage of the use of rechargeable hair clippers and trimmers, especially by professional hair stylists, is that each stylist typically has a limited work surface for storing the various combs, clippers, scissors, combs and other equipment used in hair styling. Since rechargeable appliances require a charging stand, the placement of the stand on the work surface uses more of this limited space than a corded appliance. Further, the position of the stand is important to the stylist, since, for ergonomic reasons, the stand is typically oriented for easy grasping of the charged trimmer or clipper. Most conventional charging stands are provided with a power cord that projects from a rear end of the stand. This cord placement, and the location of the power cord from the stand rear end, prevents the charging stand from being located against a backsplash, mirror or vertical wall surface which defines a rear edge of the stylist's workspace. Thus, the charging stand takes up additional space on the work surface, which is already limited. Rotating the stand 90 degrees so that the cord projects along the rear vertical surface places the clipper or trimmer in an ergonomically awkward position, and as such is an undesirable option.

Thus, there is a need for an improved appliance charging stand which is easily located in a variety of locations on the stylist's work surface.

SUMMARY

The above-listed need is met or exceeded by the present charging stand with swivel jack, which features a swiveling cord jack so that the stand is locatable against a backsplash, mirror or other vertical surface on the stylist's work surface. In the preferred embodiment, the present swivel jack is located at a corner of the charging stand, which provides the user with additional freedom to locate the stand where desired. Most preferably located at a rear corner of the stand, the jack is configured for rotation to either the rear or to the adjacent side of the stand. Thus, if desired, the stand is positionable against a backsplash, wall or mirror, and the power supply cord is connected to the stand from the side, so the cord does not space the stand away from the wall to clutter up the stylist's work area.

More specifically an appliance charging stand is provided, including a housing with an upper portion defining a receptacle for an appliance, a base connected to the upper portion and having a peripheral edge. A swiveling jack defines a power cord connection socket and is rotatably secured between the upper portion and the base to swivel about a vertical axis between a first position and a second position.

In the preferred embodiment, the base defines a front edge, a rear edge and a pair of opposed side edges, and the first position is at one of the front and rear edges, and the second position is at one of the side edges. Also, the base defines at least one corner at an intersection of the respective front edge and side edge, and rear edge and side edge, and the swivel jack is located as one of the corners. Preferably, at least one of the upper portion and the base define a recess for accommodating the rotation of the swiveling jack.

In addition, the upper housing and the rear housing each include vertically projecting bosses in registry with each other for defining a swivel axis of the swivel jack, the swivel jack having respective first and second sockets for accommodating the respective bosses. A landing is provided in the swivel jack separating the first and second sockets. Preferably, the landing is oriented so that the first socket is taller than the second socket.

A weight is preferably disposed between the upper portion and the base, within a housing cavity. On the base, a vertically-projecting locating formation matingly engaging a complementary formation on the weight. A circuit board has a pair of charging pins and is electrically connected to the swivel jack, and the circuit board is mounted at an incline relative to the base. In the preferred embodiment, the circuit board is mounted to an inclined upper end of the locating formation. When viewed from above, the swivel jack has an arcuate peripheral wall and an integrally formed linear rear wall.

In another embodiment, an appliance charging stand is provided and includes a housing with an upper portion defining a receptacle for an appliance, a base connected to the upper portion and has a peripheral edge. A swiveling jack defines a power cord connection socket and is rotatably secured between the upper portion and the base to swivel about a vertical axis between a first position and a second position. The base defines at least one corner at an intersection of respective front edge and side edge, and rear edge and side edge, and the swivel jack is located at one corner, at least one of the upper portion and the base define a recess for accommodating the rotation of the swiveling jack.

A weight is disposed between the upper portion and the base, and a locating formation on the base matingly engages a complementary formation on the weight. An upper end of the locating formation is inclined. A circuit board with at least one charging pin is mounted on the upper end of the locating formation so that at least one charging pin is disposed at an angle to vertical.

DETAILED DESCRIPTION

Figure 1:
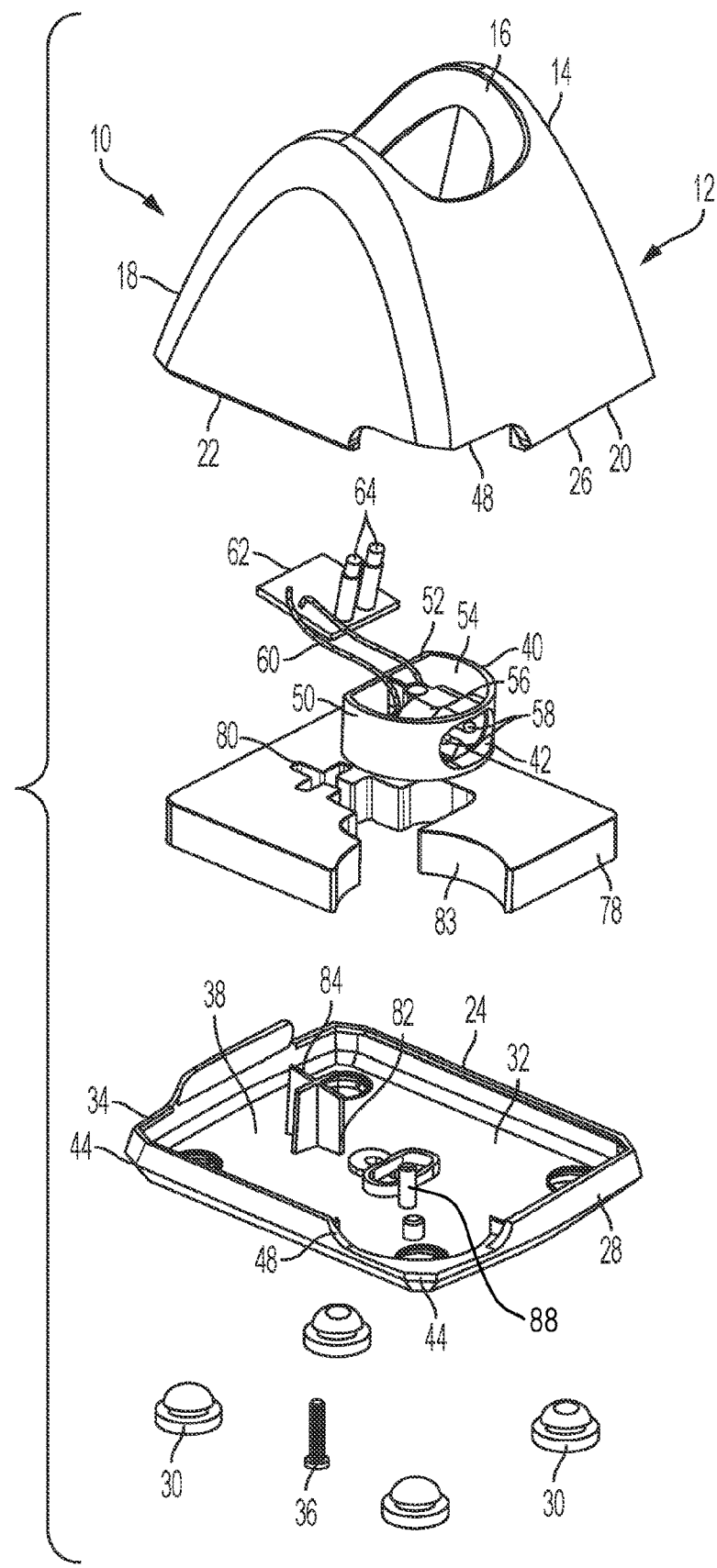
FIG. 1 is an exploded perspective view of the present charging stand.

Referring now to FIG. 1, the present charging stand is generally designated 10, and includes a housing 12 including an upper portion 14 defining a receptacle 16 for accommodating a handheld electric appliance (not shown), such as a hair clipper or trimmer. In the preferred embodiment, the receptacle 16 is oriented at an inclined angle relative to a substrate upon which the stand 10 is placed, such as a table or workstation work surface.

Figure 2:
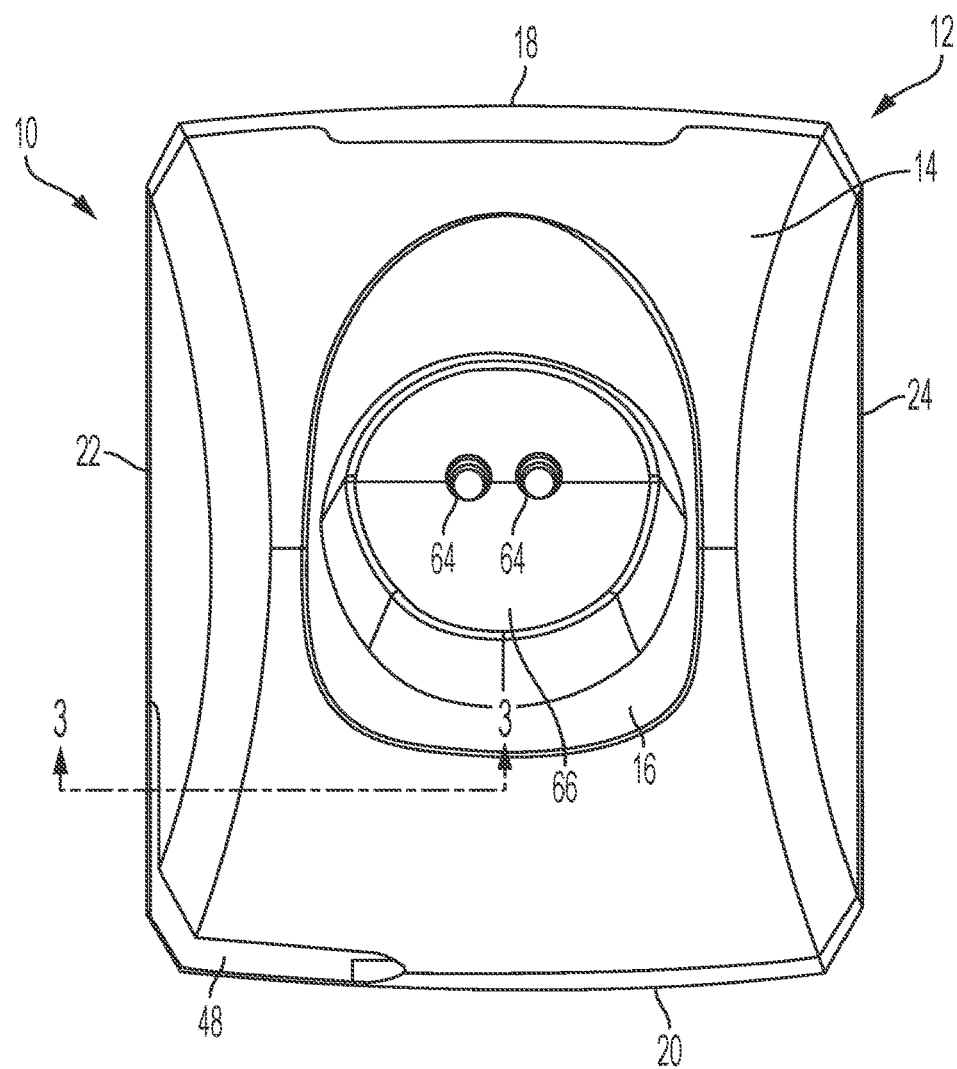
FIG. 2 is a top elevation of the charging stand of FIG. 1.

In the preferred embodiment, while other shapes are contemplated, the housing 12 has a front end 18, a rear end 20, a first side 22 and a second side 24 (FIG. 2) which combine to define a generally square footprint at a lower edge 26 of the upper housing portion 14. A complementary base 28 is secured to the lower edge 26 to complete the housing 12. At least one and preferably a plurality of resilient, rubber-like feet 30 are secured to a lower surface 32 of the base 28 using a friction fit, chemical adhesives, fasteners or similar technology well known in the art. On the base 28 is a peripheral edge 34, which is complementary to the lower edge 26 of the upper portion 14. At least one threaded fastener 36 is used to secure the base 28 to the upper portion 14. The upper portion 14 and the base 28 define an internal chamber 38

Figure 5:
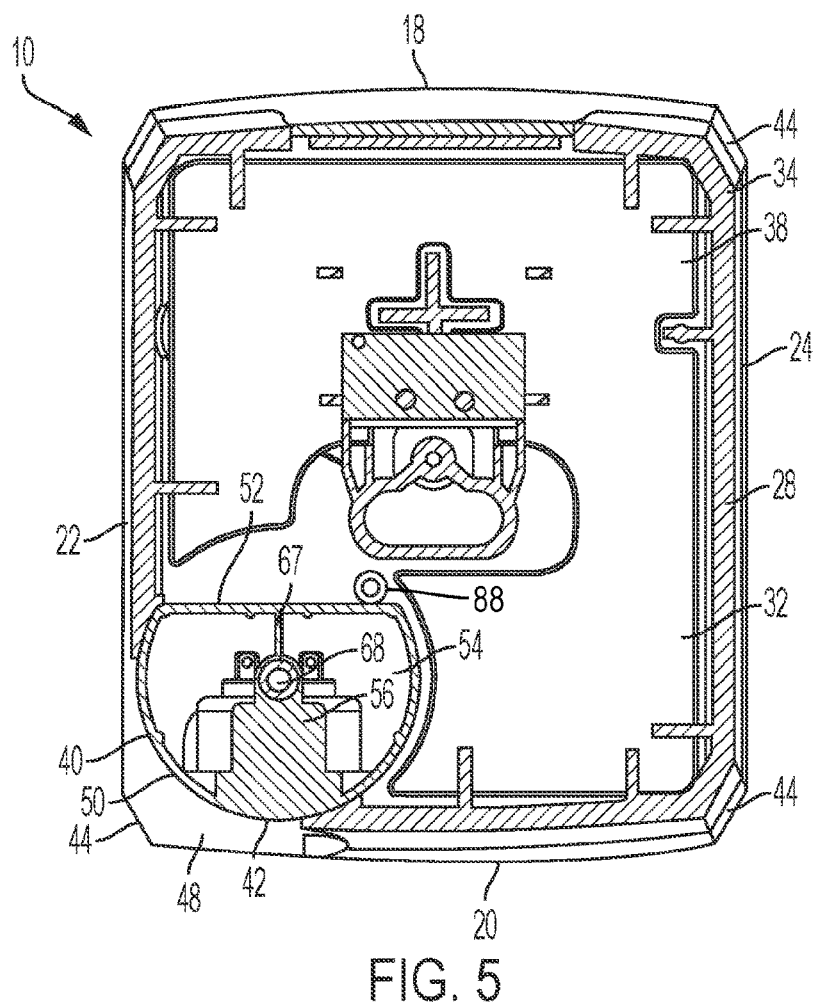
FIG. 5 is a cross-section taken along the line 5-5 of FIG. 4 and in the direction indicated generally.
Figure 6:
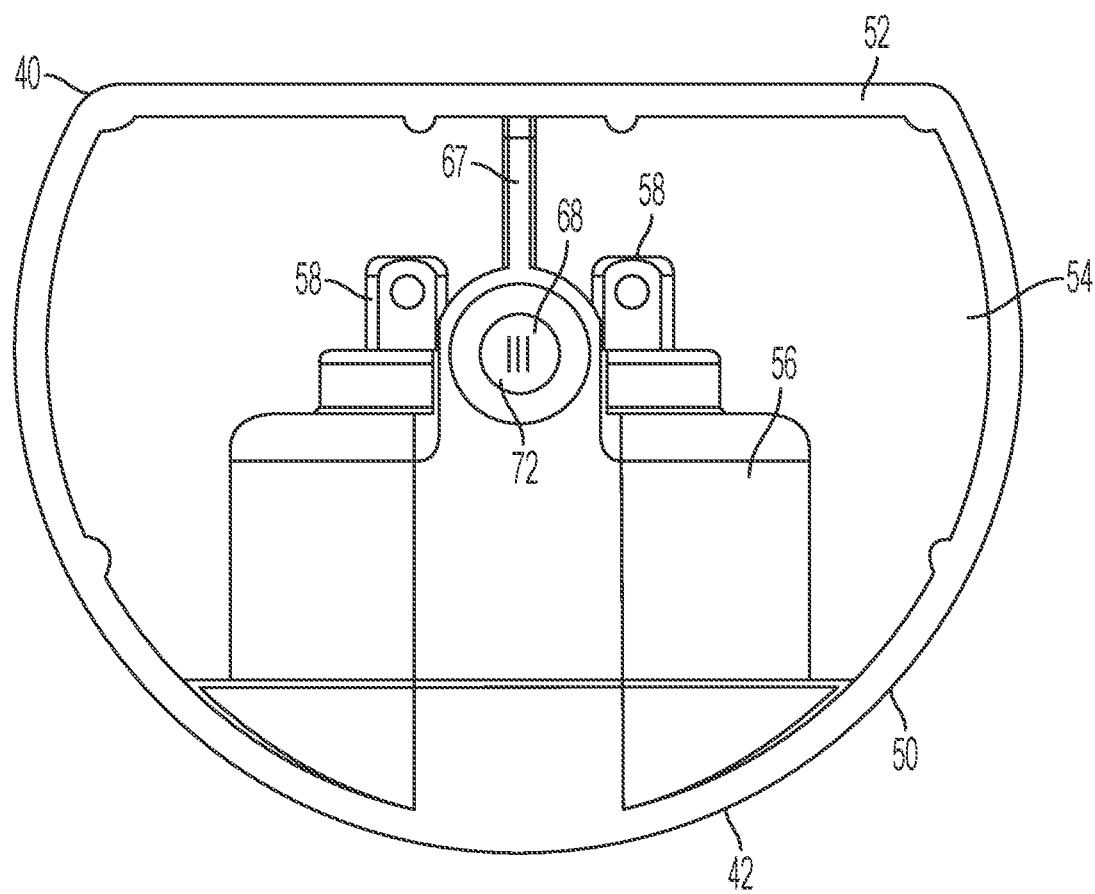
FIG. 6 is a top plan view of the present swivel jack used in the present charging stand.

Referring now to FIGS. 1, 5 and 6, a swiveling jack 40 defines a power cord connection socket 42, is located within the internal chamber 38. The swiveling jack 40 is rotatably secured between the upper portion 14 and the base 28 to swivel about a vertical axis between a first position, where the power cord connection socket 42 faces the rear end 20, and a second position where the socket faces the first side 22. It is also contemplated that the socket 42 faces the front end 18 in the first position, and the second side 24 in the second position, depending on the application.

More specifically, the base 28 defines at least one corner 44 at an intersection of respective front end 18 and first and second sides 22, 24, and rear end 20 and first and second sides, and the swivel jack 40 is located at one such corner 44. In the preferred embodiment, at least one and preferably both of the base 28 and the upper portion 14 define a recess 48 for accommodating the rotation of the swiveling jack 40.

When viewed from above, the swivel jack 40 has an arcuate peripheral wall 50 and a linear rear wall 52, the walls being integrally formed to form a "D"-shape. In the preferred embodiment, the power cord connection socket 42 is defined at an apex or midpoint of the peripheral wall 50. The walls 50, 52 define a space 54 in which is found a socket assembly 56 which forms the power connection socket 42. Further included in the socket assembly 56 is a pair of terminals 58. An internal power cord 60 is connected to each of the terminals 58 at one end, and to a circuit board 62 at an opposite end. The circuit board 62 has a pair of charging pins 64 electrically connected to the power cord and which engage the appliance at a bottom panel 66 of the receptacle 16 (FIG. 2) to recharge the appliance when the stand 10 is plugged into a power outlet using a power cord (not shown), and the appliance is properly docked in the receptacle 16 as is well known in the art. A support web 67 which is integral with the walls 50, 52 connects the socket assembly 56 to the rear wall 52.

Referring now to FIGS. 1, 3, 5 and 6, the swivel jack 40 has first, upper and second, lower sockets 68, 70 located at a junction of the support web 66 and the socket assembly 56. The sockets 68, 70 are in registry with each other and form a rotational axis of the swivel jack 40, enabling rotation relative to the housing 12 between a first position, where the power cord connection socket 42 faces the rear end 20, and a second position, where the power cord connection socket faces the first side 22. It is contemplated that the stand 10 is optionally configured so that the first and second positions relate to the front end 18 and the first side 22 or the second side 24, depending on the application. In the preferred embodiment, a landing 72 separates the first and second sockets 68, 70 of the swivel jack 40.

Figure 3:
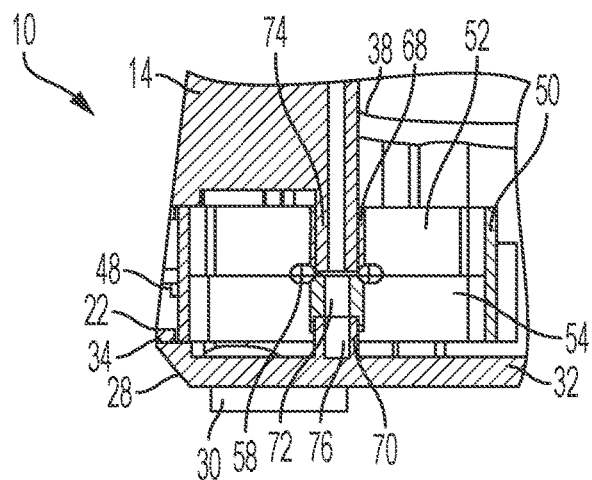
FIG. 3 is a cross-section taken along the line 3-3 of FIG. 2 and in the direction generally indicated.

Referring now to FIGS. 1 and 3, the upper portion 14 and the base 28 each respectively include vertically projecting bosses 74, 76 in registry with each other for defining a swivel axis of the swivel jack 40. In the preferred embodiment, the upper socket 68 is taller than the lower socket 70, and accordingly, the upper portion boss 74 is taller than the base boss 76. It is contemplated that this relationship is variable to suit the application. Also, in the preferred embodiment, the bosses 74, 76 and the corresponding sockets 68, 70 are dimensioned with relatively close tolerances to enhance free rotation of the swivel jack 40 but also to maintain proper alignment of the swivel jack with the housing 12.

Referring again to FIG. 1, the present charging stand 10 is preferably equipped with a weight 78 resting on the base 28, placed in the internal chamber 38 between the base and the upper portion 14. Functions of the weight 78 are to both provide stability and enhance quality experience by the user. The weight, 78, preferably solid metal or other heavy material, is preferably block-like in shape and features a locating recess formation 80, which in the preferred embodiment is cross-shaped, however other shapes are contemplated. On the base 28, a generally vertically-projecting locating formation 82 engages the locating recess formation 80. As such, the locating formation 82 is complementary in shape, and mates with the shape of the locating recess formation 80. Thus, the locating formation 82 is preferably cross-shaped in horizontal cross-section. Also preferably included on the weight 78 is a jack recess 83 dimensioned to accommodate rotation of the swivel jack 40 without interference.

The circuit board 62 with the charging pins 64 is secured, as by chemical adhesive, friction fit or suitable fasteners, to a top end 84 of the locating formation 82, which is formed at an incline, preferably at an acute angle relative to the base 28. As such, the charging pins 64, which project normally from the circuit board 62, are positioned in the receptacle 16 at an inclined angle relative to vertical for engaging the appliance once it is properly positioned in the receptacle for charging.

Figure 4:
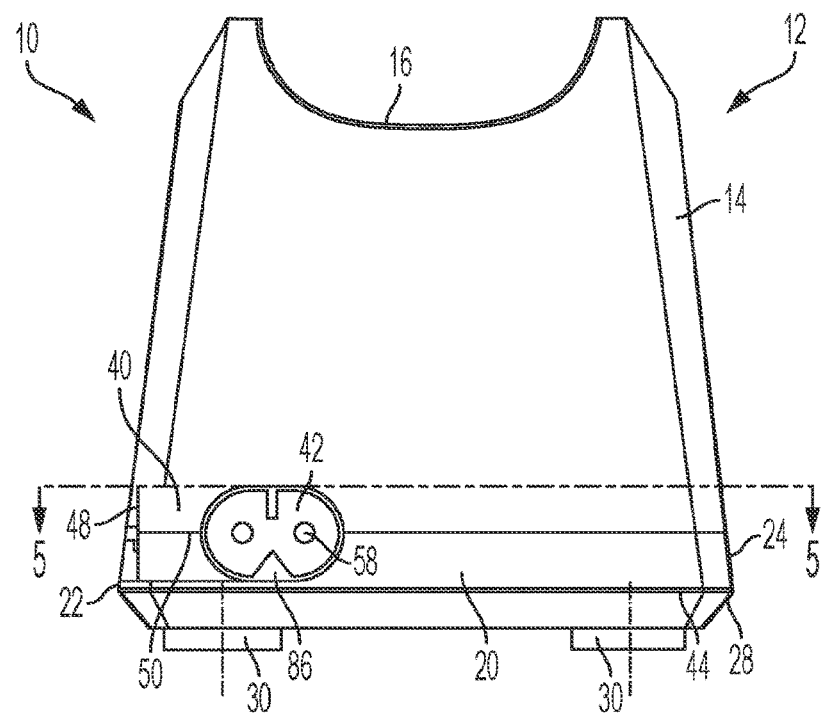
FIG. 4 is a rear elevation of the charging stand of FIG. 1.

Once assembled, the present charging stand 10 provides two positions for attachment of a power cord (not shown). In the first position, seen in FIGS. 4 and 5, the power cord connection socket 42 faces the rear end 20. In many cases, this position is undesirable because of increased clutter at stylist workstations, because the cord projecting from the rear end 20 pushes the stand 10 away from a rear vertical surface of the workstation. If desired, the swivel jack 40 is rotated to the second position so that the power connection socket 42 faces the first side 22. In that position, the rear end 20 is positionable directly against a backsplash, mirror or vertical wall surface of the stylist workstation. It is preferred that the power cord connection socket 42 is provided with at least one connection projection 86 to promote proper polarity connection of the power cord, which has a complementary formation at a corresponding connection end, as is known in the art. As seen in FIGS. 1 and 5, an integral stop member 88 is provided to the base 28 for limiting rotation of the swiveling jack 40.

While a particular embodiment of the present charging stand with swivel jack has been described herein, it will be appreciated by those skilled in the art that changes and modifications may be made thereto without departing from the invention in its broader aspects and as set forth in the following claims.

The invention claimed is:

1. An appliance charging stand, comprising:
a housing with an upper portion defining a receptacle for an appliance, a base connected to said upper portion and having a peripheral edge; and
a swiveling jack defining a power cord connection socket and rotatably secured between said upper portion and said base to swivel about a vertical axis between a first position and a second position, wherein said first position and said second position are in a defined plane that is substantially parallel to said base,
wherein said upper housing and said base each include vertically projecting bosses in registry with each other for defining a swivel axis of said swiveling jack, said swiveling jack having respective first and second sockets for accommodating said respective bosses, and wherein one of said vertically projecting bosses is taller than the other of said vertically projecting bosses.

2. The stand of claim 1, wherein said base defines a front end, a rear end, a first side and a second side, in said first position said socket faces said rear end, and in said second position, said socket faces said first side.

3. The stand of claim 2, wherein said base defines at least one corner at an intersection of respective front edge and first side, and rear edge and said second side, and said swivel jack is located at one said at least one corner.

4. The stand of claim 3, wherein at least one of said upper portion and said base define a recess for accommodating the rotation of said swiveling jack.

5. The stand of claim 1, further including a landing in said swivel jack separating said first and second sockets.

6. The stand of claim 5, wherein said landing is oriented so that said first socket is taller than said second socket.

7. The stand of claim 1, further including a weight disposed between said upper portion and said base.

8. The stand of claim 7, further including a locating formation on said base matingly engaging a complementary formation on said weight.

9. The stand of claim 1, further including a circuit board having a pair of charging pins and electrically connected to said swivel jack, being mounted at an incline relative to said base.

10. The stand of claim 9, wherein said circuit board is mounted at an acute angle relative to said base.

11. The stand of claim 9, wherein said circuit board is mounted on an upper end of a locating formation on said base used to position a weight.

12. The stand of claim 1, wherein said swivel jack, when viewed from above, has an arcuate peripheral wall and a linear rear wall, said walls integrally formed.

13. The stand of claim 1, wherein a socket assembly is connected to said rear wall by a support web.

14. The stand of claim 1, wherein the said housing includes a stop member that is positioned to abut said swiveling jack when said swiveling jack is in each of said first position and said second position, thereby restricting rotation of said swiveling jack relative to said housing.

15. An appliance charging stand, comprising:
a housing with an upper portion defining a receptacle for an appliance, a base connected to said upper portion and having a peripheral edge;
a swiveling jack defining a power cord connection socket and rotatably secured between said upper portion and said base to swivel about a vertical axis between a first position and a second position;
said base defines at least one corner at an intersection of respective front edge and side edge, and rear edge and side edge, and said swivel jack is located at one said at least one corner, at least one of said upper portion and said base define a recess for accommodating the rotation of said swiveling jack,
said swiveling jack, when viewed from above, has an arcuate peripheral wall and a linear rear wall, and said recess is closed by said peripheral wall regardless of an orientation of said swiveling jack; and
said swiveling jack has a support web which connects said power cord connection socket to said linear rear wall.

16. The stand of claim 15, wherein said base defines a front end, a rear end, a first side and a second side, in said first position said socket faces said rear end, and in said second position, said socket faces said first side.

17. The stand of claim 15, further including a landing in said swivel jack separating said first and second sockets; and
wherein said landing is oriented so that said first socket is taller than said second socket.

18. An appliance charging stand, comprising:
a housing with an upper portion defining a receptacle for an appliance, a base connected to said upper portion and having a peripheral edge;
a swiveling jack defining a power cord connection socket and rotatably secured between said upper portion and said base to swivel about a vertical axis between a first position and at least one second position, wherein said first position and second positions are in a defined plane that is substantially parallel to said base;
said upper housing and said base each include vertically projecting bosses in registry with each other for defining a swivel axis of said swiveling jack, said swiveling jack having respective first and second sockets for accommodating said respective bosses, and wherein one of said vertically projecting bosses is taller than the other of said vertically projecting bosses; and
said base defines a front end, a rear end, a first side and a second side, in said first position said socket faces one of said ends, and in said at least one second position, said socket faces either said first side or said second side.

19. The stand of claim 18, wherein said swivel jack, when viewed from above, has an arcuate peripheral wall and a linear rear wall, said walls integrally formed.

20. The stand of claim 19, wherein a socket assembly is connected to said rear wall by a support web.

* * * * *